United States Patent
Anslot et al.

(10) Patent No.: US 10,911,937 B2
(45) Date of Patent: *Feb. 2, 2021

(54) METHOD FOR ALLOCATING TEMPORARILY A SUBSCRIPTION TO A CREDENTIAL CONTAINER

(71) Applicant: THALES DIS FRANCE SA, Meudon (FR)

(72) Inventors: Michel Anslot, Meudon (FR); Marc Lamberton, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/647,681

(22) PCT Filed: Sep. 11, 2018

(86) PCT No.: PCT/EP2018/074470
§ 371 (c)(1),
(2) Date: Mar. 16, 2020

(87) PCT Pub. No.: WO2019/053009
PCT Pub. Date: Mar. 21, 2019

(65) Prior Publication Data
US 2020/0236529 A1     Jul. 23, 2020

(30) Foreign Application Priority Data

Sep. 15, 2017 (EP) .................................... 17306197
Feb. 15, 2018 (EP) .................................... 18305159

(51) Int. Cl.
*H04W 8/18* (2009.01)
*H04W 12/06* (2009.01)
*H04W 8/20* (2009.01)

(52) U.S. Cl.
CPC ............. *H04W 8/18* (2013.01); *H04W 8/205* (2013.01); *H04W 12/0608* (2019.01)

(58) Field of Classification Search
CPC .... H04W 8/18; H04W 8/205; H04W 12/0608
See application file for complete search history.

(56) References Cited

U.S. PATENT DOCUMENTS

2018/0124595 A1* 5/2018 Park ........................ H04W 8/20
2019/0104401 A1* 4/2019 Park ........................ H04W 8/20
(Continued)

FOREIGN PATENT DOCUMENTS

EP     3176720 A1    6/2017
EP     3358871 A1    8/2018

OTHER PUBLICATIONS

PCT/EP2018/074470, International Search Report, dated Oct. 29, 2018, European Patent Office, P.B. 5818 Patentlaan 2 NL-2280 HV Rijswijk.

(Continued)

*Primary Examiner* — Julio R Perez
(74) *Attorney, Agent, or Firm* — The Jansson Firm; Pehr B. Jansson

(57) ABSTRACT

A method for a credential container embedded into a wireless communication device to obtain a temporary wireless connectivity through a first wireless network, the credential container being provisioned with an identifier ID identifying the wireless communication device or the credential container and a pre-loaded subscription profile comprising a range of International Mobile Subscription Identifiers associated to a second network operator.

20 Claims, 3 Drawing Sheets

(56) References Cited

U.S. PATENT DOCUMENTS

2019/0313246 A1* 10/2019 Nix .................. H04W 12/0609
2019/0349751 A1* 11/2019 Park ........................ H04W 8/24

OTHER PUBLICATIONS

PCT/EP2018/074470, Written Opinion of the International Searching Authority, dated Oct. 29, 2018, European Patent Office, D-80298 Munich, Germany.

* cited by examiner

| MCC | MNC | MSIN |

METHOD FOR ALLOCATING TEMPORARILY A SUBSCRIPTION TO A CREDENTIAL CONTAINER

TECHNICAL FIELD

The present invention relates to a method for allocating temporarily a subscription to a credential container such as an eUICC or a UICC which can be embedded into a machine type communication (MTC) device. It is applicable to the technical domain aiming at providing connectivity in an Internet of Things (IoT) system.

BACKGROUND OF THE INVENTION

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city informationalization.

In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) or Machine to Machine (M2M) module allowing transmission of data from one IoT device to another or exchange of data between machines through UMTS/HSDPA, CDMA/EVDO, LTE, 5G, or other network evolutions.

The GSM association (GSMA) has provided in May 2016 the 3.1 version of an embedded SIM specification called "Remote Provisioning Architecture for Embedded UICC Technical Specification". This specification provides a defacto standard mechanism for the remote provisioning and management of machine to machine (M2M) connections, allowing the "over the air" provisioning of an initial operator subscription, and the subsequent change of subscription from one operator to another. Cellular devices, including IoT devices, generally require a permanent subscription for them to be able to exchange data through a wireless network. IoT devices are sometimes designed to exchange data sporadically through a wireless network, for example with a server handled by a service provider (SP). This type of IoT device requires a permanent subscription which can be used at any time despite the fact that connectivity is needed only for small time periods separated by long time intervals. The consequence is that a subscription identifier such as an (IMSI) is allocated permanently for each IoT device in addition to all the resources required to identify and manage them in an operator network. This implies significant associated costs, for example to operate OSS and BSS server notwithstanding a limited subscription usage.

SUMMARY OF THE INVENTION

This invention relates to a method for a credential container embedded into a wireless communication device to obtain a temporary wireless connectivity through a wireless network, the credential container being provisioned with an identifier ID identifying the wireless communication device or the credential container and further provisioned with a pre-loaded subscription profile comprising a range of International Mobile Subscription Identifiers associated to a second network operator, the method comprising the following steps which are applied when the wireless communication device needs to exchange data through a wireless network:

selecting randomly by the credential container an IMSI number in the range of IMSI number memorized in the pre-loaded subscription profile;

sending an attachment request comprising the randomly selected IMSI for it to be received by a computer server T-HSS associated to the second network operator, the computer server T-HSS being adapted to generate a request for getting the identifier;

receiving in an authentication request message the request for getting the identifier;

as a response, sending to the computer server T-HSS a authentication failure message comprising an indication of a synchronisation failure and the identifier ID so that the computer server T-HSS knows that the wireless communication device requests a temporary wireless connectivity;

receiving in an authentication request message a temporarily allocated IMSI associated with a subscription selected by the computer server T-HSS from a pool of subscriptions, said subscription enabling connectivity to a network operated by a first mobile network operator and a duration parameter so that the wireless communication device is able to communicate for a limited duration indicated in the duration parameter through a mobile wireless network operated by the first mobile network operator.

According to an example, the credential container is an embedded UICC (eUICC).

According to an example, the identifier ID is a eUICC identifier or an Integrated Circuit Card Identifier ICCID.

According to an example, the request for getting the eUICC identifier is received in the authentication request message using at least one of the RAND or AUTN fields.

According to an example, the authentication request message is received with a new mobile subscription identification number (MSIN) in addition to the request for getting the identifier ID, the new mobile subscription identification number (MSIN) and the request for getting the identifier ID being received in at least one of the RAND or AUTN fields of the authentication request message.

According to an example, the identifier ID is transmitted into the AUTS field of the authentication failure message.

According to an example, the authentication request message carrying the request for getting the identifier ID and the authentication request message carrying the temporarily allocated IMSI are received from a server managing the mobility of wireless communication devices.

According to an example, the method comprises a step wherein once the t-IMSI is received by the credential container, a security key Ki is derived from an Operator Variant Algorithm Configuration Field (OPc) received together with the temporary t-IMSI.

The invention also relates to a credential container configured to be embedded into a wireless communication device and to obtain a temporary wireless connectivity through a wireless network, the credential container being provisioned with an identifier ID identifying the wireless communication device or the credential container and also provisioned with a pre-loaded subscription profile comprising a range of International Mobile Subscription Identifiers associated to a second network operator MNO2, the embedded UICC being configured, when the wireless communication device needs to exchange data through a wireless network, to:

select randomly by the credential container an IMSI number in the range of IMSI number memorized in the pre-loaded subscription profile;

send an attachment request comprising the randomly selected IMSI for it to be received by a computer server T-HSS associated to the second network operator MNO2, the computer server T-HSS being adapted to generate a request for getting the identifier ID;

receive in an authentication request message the request for getting the identifier ID;

as a response, send to the computer server T-HSS an authentication failure message comprising an indication of a synchronisation failure and the identifier ID so that the computer server is able to identify the credential container as requesting a temporarily allocated subscription;

receive in an authentication request message a temporarily allocated IMSI associated with a subscription selected by the computer server T-HSS from a pool of subscriptions, said subscription enabling connectivity to a network operated by a first mobile network operator MNO1 and a duration parameter so that the wireless communication device is able to communicate for a limited duration indicated in the duration parameter through a mobile wireless network operated by the first mobile network operator MNO1.

According to an example, the credential container is an embedded UICC (eUICC).

According to an example, the identifier ID is an Integrated Circuit Card Identifier ICCID.

According to an example, the request for getting the eUICC identifier (EID) is received in the authentication request message (313) using at least one of the RAND or AUTN fields.

According to an example, the authentication request message is received with a new mobile subscription identification number (MSIN) in addition to the request for getting the eUICC identifier, the new mobile subscription identification number (MSIN) and the request for getting the eUICC identifier being received in at least one of the RAND or AUTN fields of the authentication request message.

According to an example, the eUICC identifier is transmitted into the AUTS field of the authentication failure message.

The invention also relates to a server computer T-HSS associated to a second mobile network operator MNO2 and configured to allocate temporarily a subscription to a credential container embedded into a wireless communication device for providing it with a temporary wireless connectivity through a wireless network, the credential container being further provisioned an identifier ID identifying the wireless communication device or the credential container, and being further provisioned with a pre-loaded subscription profile comprising a range of International Mobile Subscription Identifiers (IMSI) associated to the second mobile network operator MNO2, the computer server T-HSS being configured to:

detect, by receiving a subscription identifier R-IMSI selected randomly by the credential container, that the wireless communication device on which said credential container is embedded requires a temporarily allocated subscription;

request the wireless communication device to provide the identifier ID, receive in a synchronisation error message the identifier ID;

select a subscription from a pool of subscriptions taking into account the needs identified for the wireless communication device embedding the credential container, said selected subscription being associated to a first mobile network operator MNO1;

determine a duration during which the wireless communication device is authorized to use the selected subscription;

provide the credential container with a temporarily allocated IMSI (t-IMSI) associated with the selected subscription and a parameter representative of said duration for the wireless communication device to be capable of using the temporarily allocated subscription.

According to an example, the computer server T-HSS is configured to cooperate with a credential container of the type of an embedded UICC (eUICC).

According to an example, the identifier ID is an eUICC identifier or an Integrated Circuit Card Identifier ICCID.

According to an example, a parameter corresponding to a time reference is provided to the eUICC for precisely indicating a time after which the temporarily allocated subscription can be used.

According to an example, the needs of the wireless communication device are analysed using at least one information item representative of: a required quality of service, a localization of the wireless communication device, the typical duration of data exchanges used for this communication device.

According to an example, the process of selecting the temporarily allocated subscription takes into account the price implied by allocated the subscriptions maintained in the pool of subscriptions in order to minimize the costs implied by the temporary allocation.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figures 1, 2:
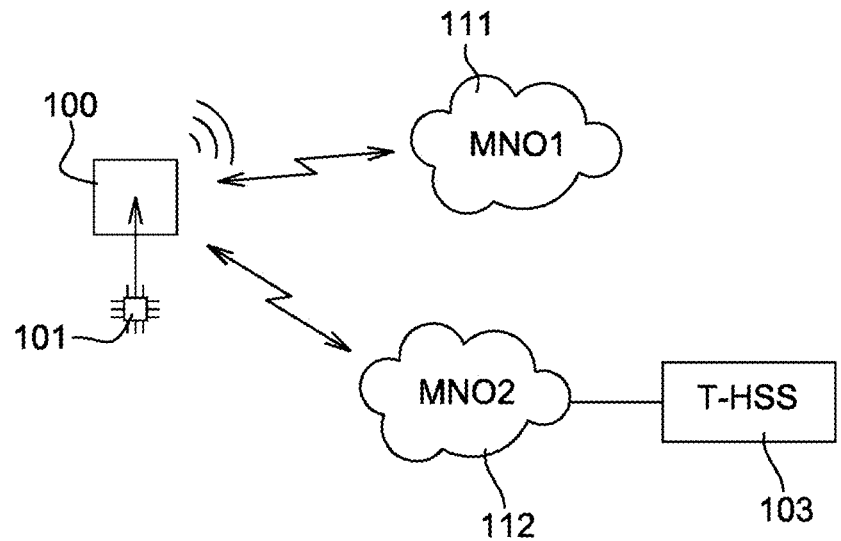
FIG. 1 illustrates schematically a system allowing to temporarily allocate a subscription to an IoT device.
FIG. 2 illustrates the format of a subscription identifier of IMSI type conveyed in the authentication signaling.

FIG. 1 illustrates schematically a system allowing to temporarily allocate a subscription to an IoT device.

According to this example, an IoT device 100 embeds a credential container. A credential container is an enclave composed of hardware and/or software in which a set of at least one credentials allowing to set up of communication channel with a wireless network can be provisioned. An example of credential container is an embedded Universal Integrated Circuit Card (eUICC), also called embedded SIM (eSIM). It refers to a secure element designed to manage multiple mobile network operator subscriptions. It is available in various form factors, either plugged-in or soldered and is manufactured by an eUICC manufacturer (EUM). An eUICC is therefore easy to integrate in any kind of device.

The following embodiments of the invention are described in the context of an IoT device embedding a eUICC. However, the skilled person will appreciate that the invention can also be applied to other types of credential containers such as a traditional UICC, an integrated UICC (iUICC) or a soft SIM installed in the IoT device. Further, the described technology is not restricted to IoT devices and can also be implemented for managing the connectivity of communication devices such as smartphones, tablets or laptops.

According to the example illustrated in FIG. 1, no mobile network operator (MNO) is permanently associated to given IoT device. However, a server designated as the T-HSS is adapted for allocating temporarily subscriptions to the IoT devices. According to an example, the T-HSS server is operated by the eUICC manufacturer (EUM). This T-HSS server provides a service to a so-called service provider (SP) whose function is to provide, collect and process data exchanged with the IoT devices.

The described system is based on the use of a T-HSS server 103 and a subscriber module, for example an eUICC.

A Home Subscriber Server (HSS) is a database server that is used in Long Term Evolution (LTE) networks for user identification and addressing, storing user profile information, mutual network-user authentication, ciphering and identity protection. A T-HSS is an HSS that is modified to implement the method described hereafter. It does not necessarily comprises all the functions implemented in a 3GPP compliant HSS. The skilled person will understand that the T-HSS is a type of server that is proposed here for exemplary purpose. Other types of discovery servers can also implement the proposed technology. Further, the following description takes the example of 4G, but the skilled person will appreciate that it can also be applied for 2G and the future 5G systems.

A plurality of commercial agreements can be set up for example between a service provider (SP) or an eUICC manufacturer (EUM) and one or several mobile network operators (MNOs). According to the example of FIG. 1 which is voluntary simplified for explanatory purposes, a service provider owns N subscriptions with a first MNO1. Each of these subscriptions is such that the wireless connectivity can be provided for one IoT device at a time.

MNO1 will provide connectivity to the IoT device 100 deployed by the service provider. For that purpose, a subscription identifier can be attributed and provisioned temporarily to the eUICC.

In this example, the IoT device 100 comprising the eUICC 101 is switched on. It generates a randomly chosen IMSI noted R-IMSI and an attachment procedure is launched. The initial access is provided by a visited network MNO2 capable of exchanging data with a T-HSS server. The R-IMSI is such that it is associated to a T-HSS server 103. The IoT device therefore tries to attach to MNO2 which routes the attachment request to the T-HSS 103.

However, the T-HSS server 103 is configured such that it detects the eUICC as requiring the attribution of a temporary connectivity. The T-HSS 103 is configured to allocate a subscription identifier to a given eUICC and in that case, it provides the eUICC with means to attach directly to the operator allocated for this temporary connection.

In other words, one aim is to create a dialog between a device embedding the eUICC and the discovery server (T-HSS) without being attached to a bootstrap cellular network and then allocate temporarily a subscription to the IoT device embedding the eUICC.

The objective is to directly attach to the targeted operator network, MNO1 in this example, among a plurality of network operators and allow the IoT device to communicate through the targeted MNO during a predetermined duration.

The proposed method and system is adapted for 3G and 4G/LTE networks without needing to modify the existing 3GPP specifications, as already existing messages are used. In addition, the proposed method and system can be implemented by the next generations of mobile networks including 5G and future standardized technologies.

The dialog between the server (T-HSS) and the eUICC is based on the use of the four authentication messages that are usually exchanged during the device attachment between a terminal and the network. These four messages are generally referred as:
  Attach request;
  Authentication request;
  Authentication failure;
  Send Authentication Info (SAI or AIR).

For Universal Mobile Telecommunications Systems (UMTS) and Long Term Evolution (LTE) networks, these messages are respectively detailed in the 3GPP technical specifications 3GPP TS 24.008 "Mobile radio interface Layer 3 specification" and 3GPP TS 24.301 "Non-Access-Stratum (NAS) protocol for Evolved Packet System (EPS)".

Further, the proposed systems re-uses the "Send Authentication Info" (SAI) which is defined in 3GPP TS 29.002 for UMTS and System Architecture Evolution (SAE).

According to the proposed technology, the ATTACH REQUEST and the SEND AUTHENTICATION INFO (SAI) messages are used to transmit a randomly generated IMSI.

The randomly generated IMSI (R-IMSI) belongs to a range of IMSI defined in a data set which can be preloaded in the eUICC at the manufacturing stage. In this example, the T-HSS server operated by the EUM is associated to the mobile network operator MNO2 as the range of IMSI of the dataset preloaded in the eUICC corresponds to a list of IMSI owned by MNO2.

According to another embodiment, the EUM can operate its own mobile network operator. The T-HSS server and the associated mobile network will be in that case operated by the same actor. Said differently, MNO2 will be operated by the EUM as well as the discovery server. The eUICC manufacturer (EUM) can have a dedicated combination of mobile country code (MCC) and mobile network code (MNC) fields that will be used for the routing of messages toward the discovery server. In that case, it is not needed for the eUICC manufacturer (EUM) to operate a full infrastructure of a real MNO.

According to another embodiment, the mobile network operator MNO2 can be different from the EUM and operate by himself the discovery server (D-HSS).

FIG. 2 illustrates the format of a subscription identifier of IMSI type conveyed in the authentication signaling.

Figure 3:
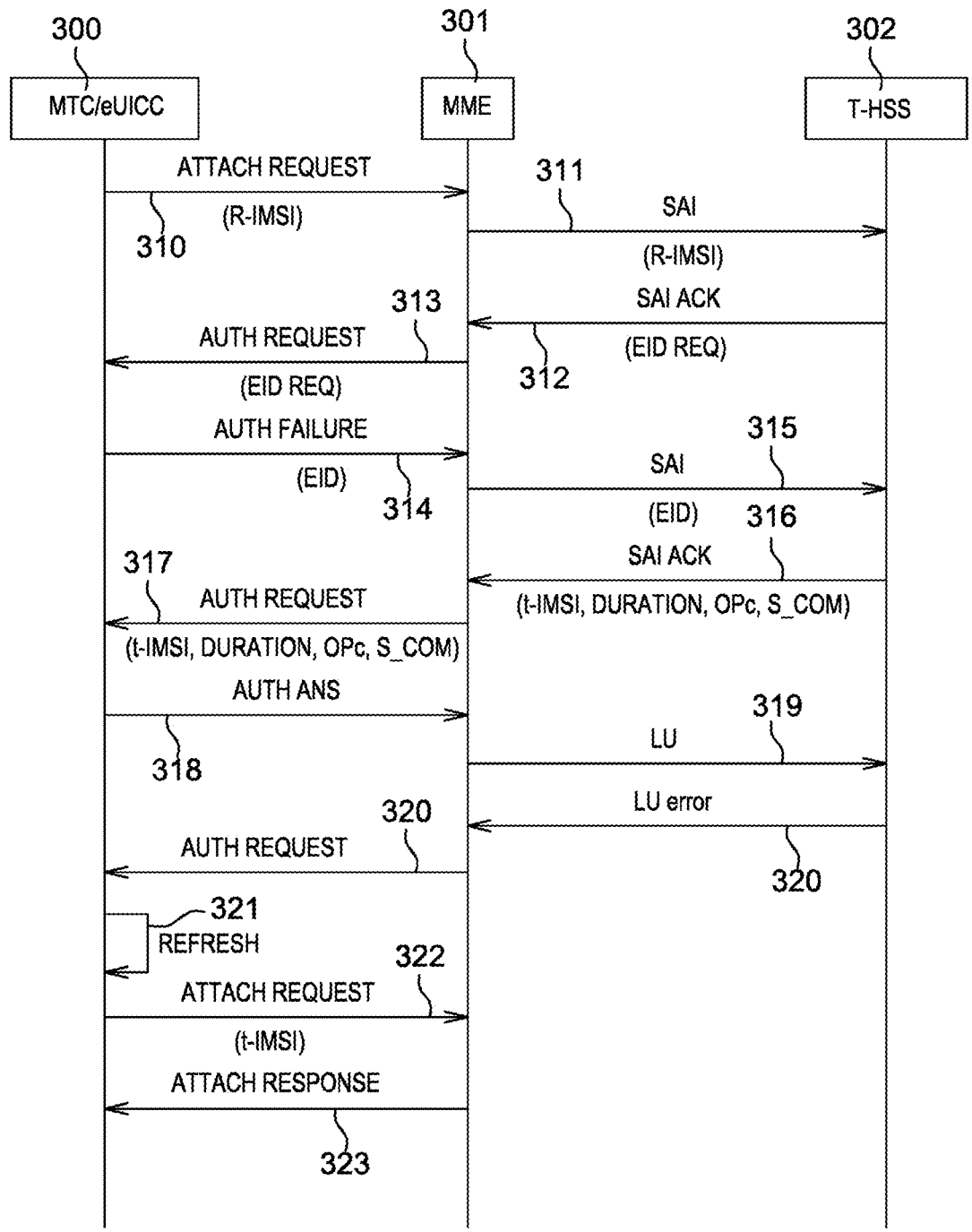
FIG. 3 illustrates a sequence diagram allowing to trigger by an IoT device the temporary allocation of a subscription.

The format of a standard IMSI contains on three digits a Mobile Country Code (MCC), on two or three digits a Mobile Network Code (MNC) and on nine or ten digits the Mobile Subscriber Identifier Number (MSIN). The IMSI identifies the subscription FIG. 3 illustrates a sequence diagram allowing to trigger by an IoT device the temporary allocation of a subscription.

On this figure, the T-HSS server 302 is operated by the eUICC manufacturer (EUM). In addition, a mobility management entity (MME) 301 of a mobile network operator and the target eUICC 300 are represented. The target eUICC 300 is an eUICC provisioned with a pre-loaded profile. This pre-loaded profile corresponds to a subscription profile similar to what is description in GSMA REF, but with several slight modifications. One difference is that the pre-loaded subscription profile is not initially provisioned with a subscription identifier associated to a real subscription nor credentials such as the security keys that are generally required for authentication and ciphering when connecting to the network of a given mobile network operator, as those are provided or determined when a wireless connection is requested by the IoT device. The pre-loaded subscription profile contains a pre-defined range of R-IMSI numbers which are not associated to a real subscription but which are allowing the eUICC to be detected by the T-HSS server 302 when transmitted in an attachment request. According to the invention, the pre-loaded subscription profile needs to be associated with a valid subscription for allowing the IoT device on which the eUICC is installed to be able to connect to a wireless communication network.

According to this example, a subscription that will be associated to the pre-loaded subscription profile is selected among a plurality of subscriptions in a pool managed by the T-HSS server 302. When a given IoT device needs connectivity, a subscription identifier such as an IMSI which is associated to one of the subscription maintained in the pool can be allocated to the eUICC 300. When the IoT device needs connectivity for transmitting and/or receiving data to/from an application server, it tries to attach to a mobile network using data contained in its pre-loaded profile.

The IoT device sends an attach request 310 message to the MME 301 of the MNO2. It uses a conventional attach request message, for example one that is standardized in 3GPP for UMTS or LTE, but instead of transmitting an IMSI allocated to a subscriber, it transmits a random IMSI noted R-IMSI that is generated by the eUICC taking into account the IMSI range as defined in the pre-loaded profile.

Then, the MME 301 sends 311 a Send Authentication Info (SAI) message to the discovery server 302. The SAI message also contains the R-IMSI generated by the eUICC. The T-HSS server 302 is configured for being associated to the IMSI numbers that are belonging to the predefined range of IMSI as provisioned in the pre-loaded subscription profile of the eUICCs.

According to an embodiment, the IMSI of the range memorized in the pre-loaded subscription profile of the eUICC have the same mobile network code (MNC) and mobile country code (MCC) fields as these IMSI are owned by the same operator (MNO2). Therefore, it is said that the T-HSS server is associated to this operator. According to this example, the discovery server is operated by an eUICC manufacturer having an agreement with a mobile network operator MNO2.

The T-HSS server 302 then replies to the MME 301 with an SAI acknowledgment message 312 comprising a request in the RAND and/or the AUTN fields for the eUICC to send the EID and optionally a new mobile subscription identification number (MSIN).

This new MSIN can be used to re-launch data exchanges between the IoT device and the T-HSS server in case of a failure in the process. Indeed, the re-use of the already generated R-IMSI can be blocked by the mobile network operator associated with the discovery server.

The MME 301 of the visited network then forwards the EID request and optionally the new MSIN to the target eUICC 300 using a standard authentication request message 313, the EID request and optionally the new MSIN being transmitted in the RAND and/or AUTN fields of the authentication request message 313.

The IoT device embedding the eUICC 300 then replies to the MME 301 using an authentication synchronization failure 314 message. The number of bits of this message is the same as what is standardized in 3GPP specifications, but it is diverted in order to transmit the EID (or another device or credential container identifier such as the IMEI or the ICCID) into the AUTS field of the authentication synchronization failure message 314.

The MME 301 then forwards 315 the authentication synchronization failure message to the discovery server 302 using a SAI message.

Once the EID is received 302, the T-HSS server analyses the request for connectivity and, when it is possible, allocates temporarily to the IoT device a subscription selected among the plurality of subscriptions contained in the pool managed by the T-HSS server 302. This is done by associating the pre-loaded subscription profile with the subscription identifier of the aforementioned selected subscription. According to an embodiment, the duration during which the allocated subscription can be used for the IoT device is determined by the T-HSS server. Then, the T-HSS server 302 replies 316 to the MME 311 of the visited network with a SAI ACK message 316 containing an IMSI switch command S_COM, the allocated t-IMSI, a parameter indicating the duration during which the temporary allocated subscription can be used, and optionally the Operator Variant Algorithm Configuration Field (OPc) encoded in the RAND/AUTN fields of an authentication vector. As a reminder, an authentication vector is a set of parameters which provides temporary authentication data needed to engage authentication with a particular user.

The MME 301 of the visited network forwards the t-IMSI, the duration parameter, the OPc and the IMSI switch command S_COM using an authentication request transmitted 317 to the IoT device embedding the eUICC 300.

The IoT device embedding the eUICC 300 replies with an authentication answer message 318 containing a valid expected authentication response RES that is generated using the diverted RAND and AUTN fields received in the authentication request 317. The authentication response RES can be calculated according to 3GPP TS 133.102 in case of a UMTS transmission and 3GPP TS 33.401 in case of an LTE transmission.

Then, a location update message 319 (or a tracking area update TAU in case of an LTE compliant system) is transmitted 319 by the MME 301 of the visited network to the T-HSS server 302. The T-HSS server 302 is configured to reject the location update 319 and the attachment is rejected by the T-HSS 302 withinvalid data. It leads to the transmission of an attach reject message 320 by the MME 301 to the IoT device embedding the eUICC 300.

At this stage, the eUICC is configured to use the allocated subscription for the duration specified in the duration parameter received from the T-HSS server 3012 in message 317. For that purpose, the pre-loaded profile to which is added the received t-IMSI is used. In addition, the eUICC computes and sets up the security key Ki for the t-IMSI. According to an embodiment, the security key Ki is generated thanks to a key derivation algorithm combining a security key preloaded in the eUICC and the received t-IMSI. The EUM personalization center generated the Ki for these IMSI using the same key derivation algorithm or the discovery server is also able to generate to the same Ki to provision the t-IMSI network. It is therefore possible to secure the data exchanges without requiring the transmission of the security key Ki over the air.

Then the eUICC sends 321 a "refresh" proactive command to the IoT device 300 which triggers an eUICC initialization procedure. As a consequence, the IoT device attempts to attach again. An attach request 322 is transmitted, this time using the t-IMSI instead of the R-IMSI. The standard attachment procure (not represented) is then carried out and as the t-IMSI belongs to the target operator and this its network is configured to accept attachment with these predefined temporarily allocated IMSI, an attachment response 323 indicating that the attachment procedure is successful is received by the IoT device embedding the eUICC.

Once the IoT device is attached to the target network, it automatically opens an access point name (APN) allowing it to transmit data and receive data through the network of the selected mobile network operator (MNO).

Figure 4:
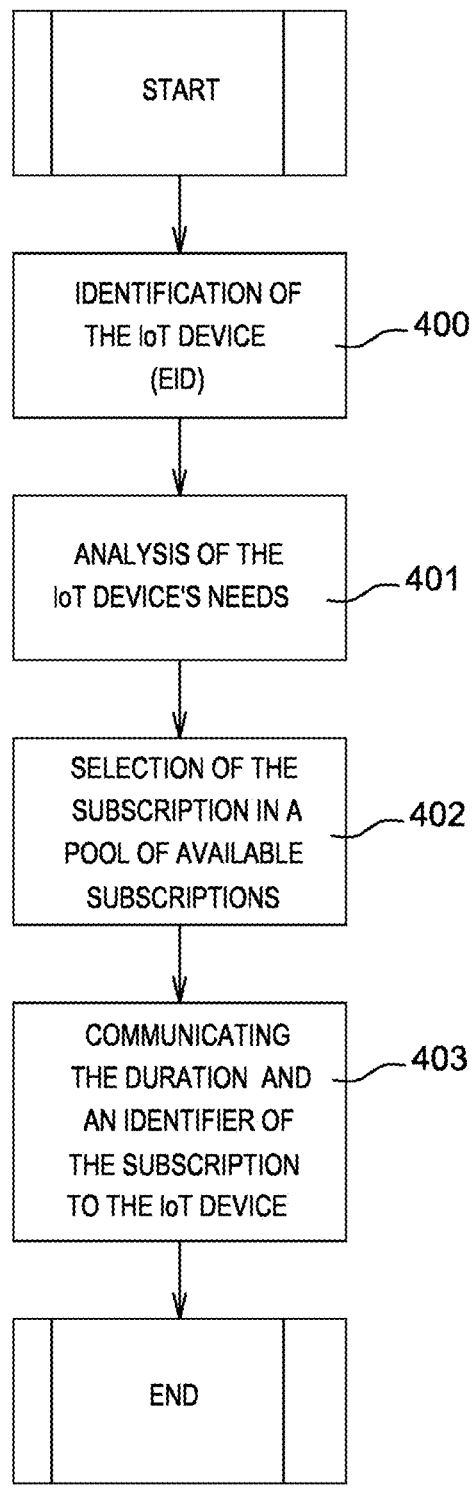
FIG. 4 is an example of flowchart illustrating the steps which can be carried out by a T-HSS server for allocating temporarily a subscription profile to a given IoT device.

FIG. 4 is an example of flowchart illustrating the steps which can be carried out by a T-HSS server for allocating temporarily a subscription profile to a given IoT device.

Once the T-HSS server 302 detects that a given IoT device requests connectivity, a temporary subscription needs to be selected. For that purpose, the steps described hereafter can be implemented by the T-HSS server.

The first step 400 is the detection that a given IoT device requests a wireless connectivity and the identification of this device. This is performed by the T-HSS server when a the messages containing the R-IMSI 311 and then the eUICC identifier EID 315 are received by the T-HSS server 302. The skilled person will appreciate that other types of identifiers can be used in the context of this invention, such as an Integrated Circuit Card Identifier ICCID. An identifier of the IoT device can also be used instead of an identifier of the credential container.

Then the next step 401 is an analysis of the connectivity needs for providing the IoT device with an appropriate subscription.

This analysis corresponds for example by compiling a plurality of information items associated to the IoT device and its eUICC. For example, information items corresponding to one or several of these data can be collected:
- Localization of the requesting IoT device; this can be implemented for example by providing an identifier of the cell (Cell-ID) on which the IoT device tries to attach;
- Quality of Service (QoS) adapted for the data exchange;
- Typical duration of a data exchange for this IoT device; for that purpose, a statistical analysis can be carried out by the T-HSS based on the last data transmissions and receptions performed by this device;

Then, based on this analysis, the T-HSS server can select 402 one of the subscription in the pool for providing the IoT device with a temporary allocated subscription fulfilling its communication needs while serving the interest of the service provider, for example by minimizing costs. For example, a subscription allowing data exchange with a high data rate will be too costly and oversized for a given IoT device which has to transmit only a small amount of data.

Further, a subscription which is already allocated to an IoT device cannot be allocated to another one. Therefore, the T-HSS server has to manage the pool of subscriptions such that it is able to distinguish those which are available from those which are already allocated and therefore not available.

For example, the subscriptions of the pool can be ranked in order of priority for being selected by the T-HSS server for a given IoT device taking into account one or several of the aforementioned criteria. For example, the criteria that are taken into account can be weighted and summed up in order to provide a ranking number Rs corresponding to a priority level.

The subscription which is associated to the highest selection priority level and which is available will be selected.

When a given subscription is selected by the T-HSS server, it has to be associated with a duration that will also be communicated to the IoT device for it to know the time during which it is allowed to use the subscription. In addition to the duration, a time reference can also be provided. The parameters that will be communicated to the IoT device for it to be aware of the allocated time for used the temporary allocated subscription correspond in that case a time reference indicating the starting time and the duration itself. By providing the time reference to the IoT device, the network associated to the selected subscription and the IoT device are synchronized and the T-HSS server is capable of allocating temporarily the subscriptions to a plurality of IoT devices and maximize their usage.

Then, the subscriber identifier corresponding to the selected subscription and the duration can be transmitted 403 by the T-HSS 302 to the eUICC as proposed in the example of FIG. 3.

When the period of time determined thanks to the received duration parameter and during which the allocated subscription can be used by the IoT device expires, the temporarily allocated IMSI can be deleted from the credential container. On the T-HSS server side, the corresponding subscription can be labelled as available for being later on allocated to another IoT device.

The invention claimed is:

1. A method for a credential container embedded into a wireless communication device to obtain a temporary wireless connectivity through a wireless network, the credential container being provisioned with an identifier (ID) identifying the wireless communication device or the credential container and a pre-loaded subscription profile comprising a range of International Mobile Subscription Identifiers (IMSI) associated to a second network operator, the method comprising the following steps which are applied when the wireless communication device needs to exchange data through the wireless network:
   selecting randomly by the credential container an IMSI number in the range of IMSI number memorized in the pre-loaded subscription profile;
   sending an attachment request comprising the randomly selected IMSI for it to be received by a computer server associated to the second network operator, the computer server being adapted to generate a request for getting the identifier;
   receiving in a first authentication request message the request for getting the identifier;
   as a response, sending to the computer server an authentication synchronization failure message comprising an indication of a synchronisation failure and the identifier (ID) so that the computer server knows that the wireless communication device requests a temporary wireless connectivity;
   receiving in a second authentication request message a temporarily allocated IMSI (t-IMSI) associated with a subscription selected by the computer server from a pool of subscriptions, said subscription enabling connectivity to a network operated by a first mobile network operator and a duration parameter so that the wireless communication device is able to communicate for a limited duration indicated in the duration parameter through a mobile wireless network operated by the first mobile network operator.

2. The method according to claim 1, wherein the credential container is an embedded UICC (eUICC (embedded Universal Integrated Circuit Card)).

3. The method according to claim 2, wherein the identifier ID is an eUICC identifier or an Integrated Circuit Card Identifier (ICCID).

4. The method according to claim 3, wherein the first authentication request message has at least one of a field named RAND or an field named AUTN and the request for getting the eUICC identifier is received in the first authentication request message using at least one of the RAND or AUTN fields.

5. The method according to claim 1, wherein the first authentication request message has at least one of a field named RAND or an field named AUTN and the first authentication request message is received with a new mobile subscription identification number in addition to the request for getting the identifier (ID), the new mobile subscription identification number and the request for getting the identifier (ID) being received in at least one of the RAND or AUTN fields of the authentication request message.

6. The method according to claim 1, wherein the authentication synchronization failure message has a field named AUTS and the identifier (ID) is transmitted in the AUTS field of the authentication synchronization failure message.

7. The method according to claim 1, wherein the first authentication request message carrying the request for getting the identifier (ID) and the second authentication request message carrying the temporarily allocated IMSI (t-IMSI) are received from a server managing the mobility of wireless communication devices.

8. The method according to claim 1, comprising a step wherein once the t-IMSI is received by the credential container, a security key (Ki) is derived from an Operator Variant Algorithm Configuration Field received together with the temporary t-IMSI.

9. A credential container embedded into a wireless communication device and to obtain a temporary wireless connectivity through a wireless network, the credential container being provisioned with an identifier (ID) identifying the wireless communication device or the credential container and also provisioned with a pre-loaded subscription profile comprising a range of International Mobile Subscription Identifiers (IMSI) associated to a second network operator, the credential container being configured, when the wireless communication device needs to exchange data through the wireless network, to:
   select randomly by the credential container an IMSI number in the range of IMSI number memorized in the pre-loaded subscription profile;
   send an attachment request comprising the randomly selected IMSI (R-IMSI) for it to be received by a computer server associated to the second network operator, the computer server configured to generate a request for getting the identifier ID;
   receive in a first authentication request message the request for getting the identifier (ID);
   as a response, send to the computer server an authentication synchronization failure message comprising an indication of a synchronisation failure and the identifier ID so that the computer server is able to identify the credential container as requesting a temporarily allocated subscription;
   receive in a second authentication request message a temporarily allocated IMSI associated with a subscription selected by the computer server from a pool of subscriptions, said subscription enabling connectivity to a network operated by a first mobile network operator and a duration parameter so that the wireless communication device is able to communicate for a limited duration indicated in the duration parameter through a mobile wireless network operated by the first mobile network operator.

10. The credential container according to claim 9, wherein the credential container is an embedded UICC (eUICC (embedded Universal Integrated Circuit Card)).

11. The credential container according to claim 10, wherein the identifier (ID) is eUICC identifier or an Integrated Circuit Card Identifier (ICCID).

12. The credential container according to claim 11, wherein the request for getting the eUICC identifier is received in the first authentication request message using at least one of the RAND or AUTN fields.

13. The credential container according to claim 11, wherein the first authentication request message has at least one of a field named RAND field or a field named AUTN and the first authentication request message is received with a new mobile subscription identification number in addition to the request for getting the eUICC identifier, the new mobile subscription identification number and the request for getting the eUICC identifier being received in at least one of the RAND or AUTN fields of the first authentication request message.

14. The embedded UICC according to claim 9, wherein the authentication synchronization failure message has a field named AUTS and the eUICC identifier is transmitted in the AUTS field of the authentication synchronization failure message.

15. A server computer associated to a second mobile network operator and configured to allocate temporarily a subscription to a credential container embedded into a wireless communication device for providing it with a temporary wireless connectivity through the wireless network, the credential container being further provisioned with an identifier (ID) identifying the wireless communication device or the credential container, and being further provisioned with a pre-loaded subscription profile comprising a range of International Mobile Subscription Identifiers associated to the second mobile network operator, the computer server being configured to:
   detect, by receiving a subscription identifier R-IMSI selected randomly by the credential container, that the wireless communication device on which said credential container is embedded requires a temporarily allocated subscription;
   request the wireless communication device to provide the identifier (ID);
   receive in a synchronisation error message the identifier (ID);
   select a subscription from a pool of subscriptions taking into account the needs identified for the wireless communication device embedding the credential container, said selected subscription being associated to a first mobile network operator;

determine a duration during which the wireless communication device is authorized to use the selected subscription;

provide the credential container with a temporarily allocated IMSI associated with the selected subscription and a parameter representative of said duration for the wireless communication device to be capable of using the temporarily allocated subscription.

16. The computer server according to claim 15, being configured to cooperate with a credential container of the type of an embedded UICC (eUICC).

17. The computer server according to claim 16, wherein the identifier (ID) is an eUICC identifier or an Integrated Circuit Card Identifier (ICCID).

18. The computer server according to claim 16, wherein a parameter corresponding to a time reference is provided to the eUICC for precisely indicating a time after which the temporarily allocated subscription can be used.

19. The computer server according to claim 16, wherein the needs of the wireless communication device are analysed using at least one information item representative of: a required quality of service, a localization of the wireless communication device, the typical duration of data exchanges used for this communication device.

20. The computer server according to claim 16, wherein the process of selecting the temporarily allocated subscription takes into account the price implied by allocated the subscriptions maintained in the pool of subscriptions in order to minimize the costs implied by the temporary allocation.

* * * * *